United States Patent Office.

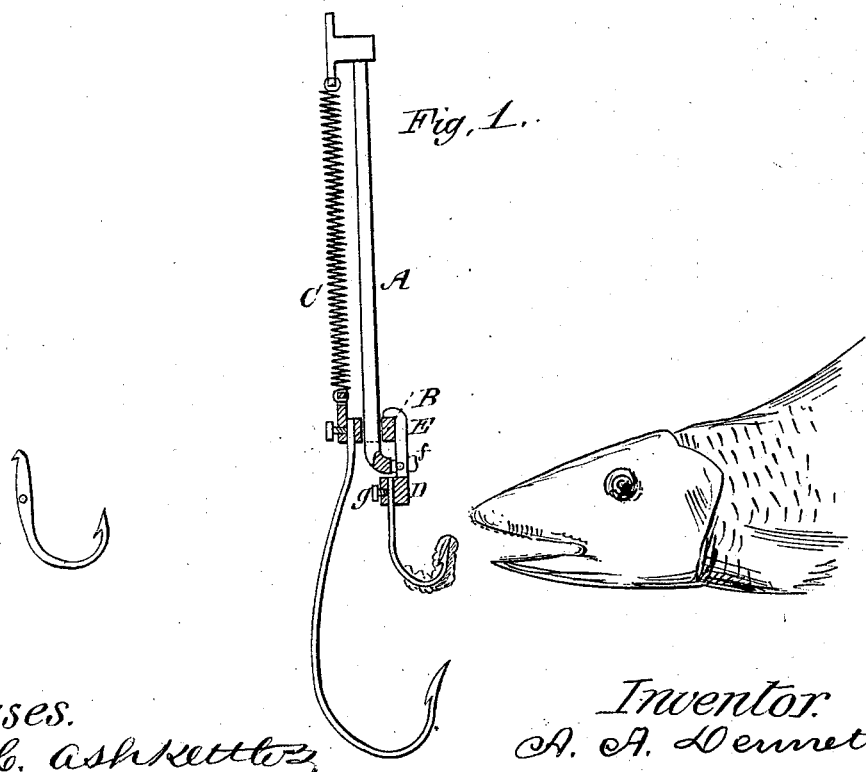

A. A. DENNETT, OF NEW BRUNSWICK, NEW JERSEY.

Letters Patent No. 80,151, dated July 21, 1868.

IMPROVEMENT IN FISHING-TACKLE.

The Schedule referred to in these Letters Patent and making part of the same.

TO ALL WHOM IT MAY CONCERN:

Be it known that I, A. A. DENNETT, of New Brunswick, in the county of Middlesex, and State of New Jersey, have invented a new and improved Fishing-Tackle; and I do hereby declare that the following is a full, clear, and exact description thereof, which will enable those skilled in the art to make and use the same, reference being had to the accompanying drawings, forming part of this specification.

This invention relates to an improvement in a spring-hook fishing-tackle, which has been already patented by A. J. Lenhart.

In the patented arrangement, the shank of the hook is itself pivoted to the bar, the shank being formed as represented by the detached figure in the drawing.

These hooks are very liable to break at the pivot, and although the hook may be replaced by another if the proper facilities are at hand, to a fisherman, in the woods, or elsewhere, away from such facilities, great trouble and inconvenience is occasioned thereby.

The object of this invention is to avoid this trouble, and the present invention consists in attaching the shank of the hook to a socket-block, and fastening and adjusting it by a screw, as hereinafter described.

Figure 1 represents the tackle, constructed according to the patent already alluded to, with the exception of the manner of fastening or adjusting the hook, and, as my invention is confined to that feature, the general arrangement of the tackle requires no particular description.

A is the bar or rod, which supports the hook.

B is a slide on the bar A.

C is the spiral spring, which is attached rigidly to the top of the bar, as seen.

D is a socket-block, which has a shank, E, which shank is pivoted to the bar A at $f$.

The upper end of the shank hooks on to the slide B, the same as the hook seen in the detached view, (in red.)

This block is drilled, so as to admit the shank of the hook, as seen in the drawing, where it is secured by a screw, $g$.

The lower hook H is secured to the block B in the same manner.

By this method of fastening and adjusting the hook, (either one or both,) there is no trouble in attaching a new hook wherever the sportsman may be, as nothing but the ordinary hook (and no tools) is required.

Having thus described my invention, I claim as new, and desire to secure by Letters Patent—

1. The socket-block D and the screw $g$ in combination with the fishing-tackle, substantially as shown and described.

2. Fastening or adjusting the hook in the fishing-tackle represented, by a screw, instead of a rivet, substantially as shown and described.

The above specification of my invention signed by me, this 1st day of February, 1868.

A. A. DENNETT.

Witnesses:
WM. F. McNAMARA,
ALEX. F. ROBERTS.